F. M. GREENUP.
COMBINED COMPUTING AND INDICATING SCALE.
APPLICATION FILED APR. 21, 1913.
1,195,135.
Patented Aug. 15, 1916.
2 SHEETS—SHEET 2.
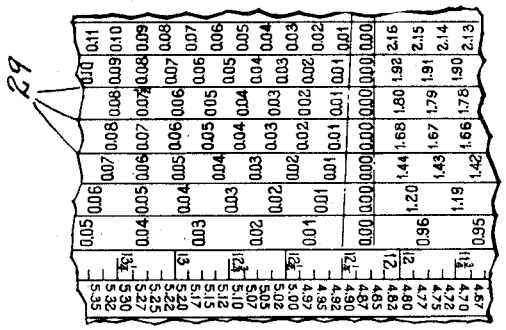
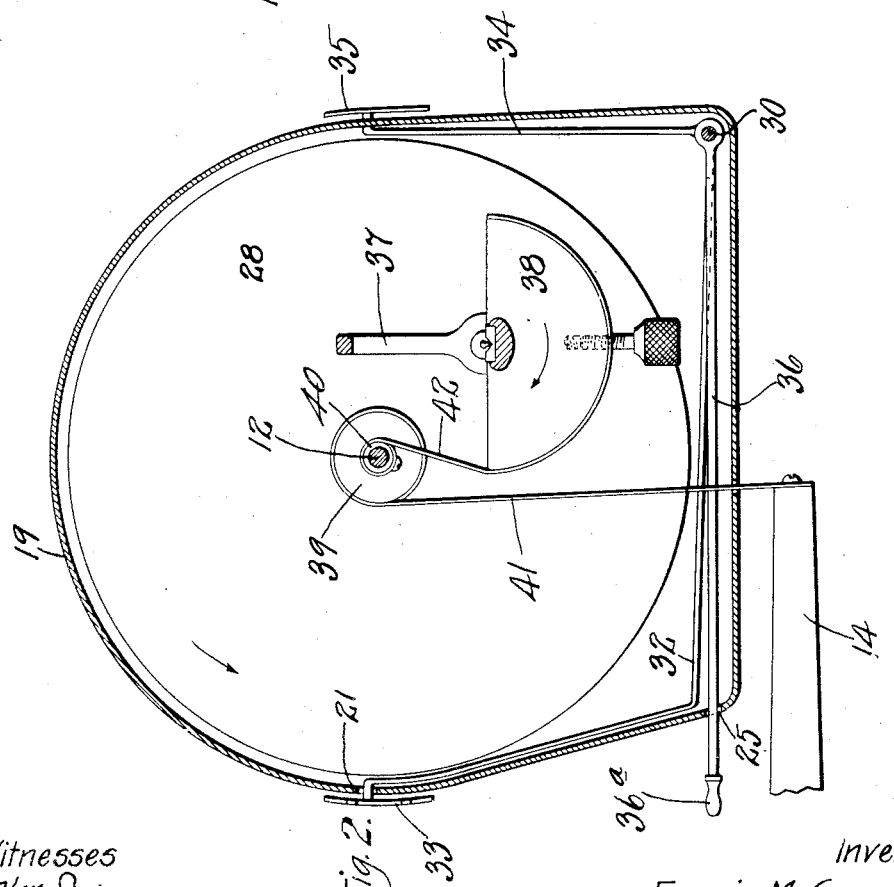
Witnesses
Inventor
Francis M. Greenup

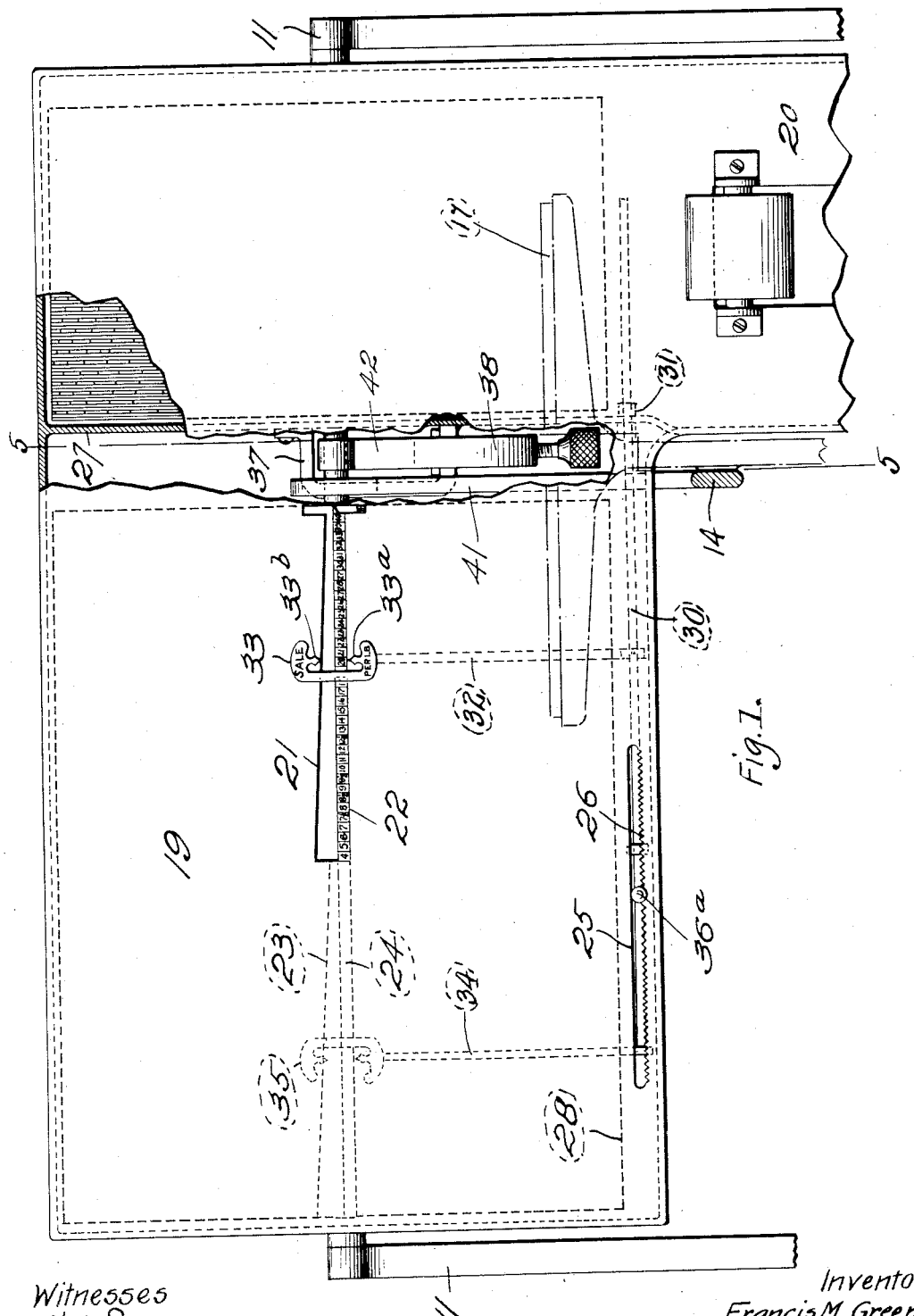

UNITED STATES PATENT OFFICE.

FRANCIS M. GREENUP, OF ST. LOUIS, MISSOURI, ASSIGNOR, BY MESNE ASSIGNMENTS, OF ONE-HALF TO HARRY A. JACKSON, OF ST. LOUIS, MISSOURI.

COMBINED COMPUTING AND INDICATING SCALE.

1,195,135.

Specification of Letters Patent. Patented Aug. 15, 1916.

Application filed April 21, 1913. Serial No. 762,544.

*To all whom it may concern:*

Be it known that I, FRANCIS M. GREENUP, a citizen of the United States, residing in the city of St. Louis, State of Missouri, have invented a certain new and useful Improvement in Combined Computing and Indicating Scales, of which the following is a full, clear, and exact description, such as will enable others skilled in the art to which it appertains to make and use the same, reference being had to the accompanying drawings, forming part of this specification, in which—

Figure 1 is a front elevational view of the housing of my improved machine the same containing the computing disks and indicating cylinder, a portion of which housing is broken away to more clearly show parts on the interior thereof. Fig. 2 is a cross sectional view taken approximately on the line 5—5 of Fig. 1. Fig. 3 is a fragmentary view of a portion of the indicating cylinder used in my improved machine.

My invention relates particularly to a scale or weighing machine, such as is ordinarily used in stores and shops for weighing comparatively small quantities of commodities, such as meat, butter, sugar, tea, coffee, and like articles of household use which are usually bought by weight and the selling price of which fluctuates.

The principal object of my invention is to provide a weighing machine having a simple indicating and computing means which will readily and correctly show to both the salesman and the purchaser the exact weight of the article placed on the scale platform, and the selling price of said article.

With the foregoing and other objects in view, my invention consists in certain novel features of construction and arrangement of parts hereinafter more fully described and claimed.

Referring by numerals to the accompanying drawings, 11 designates a pair of vertically disposed posts or standards the upper ends of which are provided with bearings in which is mounted for rotation a shaft 12. One end of the horizontally disposed scale beam 14, which carries a platform 17 (shown by dotted lines in Fig. 1) extends beneath the central portion of the housing which contains the operating parts of my improved scale and which are hereinafter more fully described.

The housing of my improved machine comprises a substantially cylindrical portion 19 which surrounds the shaft 12 and extends from one post or upright 11 to the other, and this portion of the housing incloses the indicating cylinder of the machine and the computing disks thereof. The right hand portion of this housing 19 is extended downward in substantial box-shape as designated by 20, and incloses practically all of the adding and printing mechanism with which my improved machine is associated.

Formed in the front wall of the housing 19 is a horizontally disposed slot 21 which forms a sight opening through which the salesman may observe the figures upon the right hand portion of the indicating cylinder which occupies said housing. Arranged on the outer face of the housing immediately below this slot is a graduated scale 22 which is properly numbered, for indicating the price per pound of the commodity that is weighed upon the scale.

Formed in the left hand portion of the rear wall of the housing 19 is a slot 23 which corresponds to the slot 21, and this slot 23 is for the purpose of permitting the purchaser to readily observe upon the indicating cylinder within the housing 19 the total amount or cost of the article placed on the platform of the scale. Arranged on the face of the housing 19 immediately below this slot 23 is a graduated scale 24 which is numbered to correspond to the numbering on the scale 22.

Formed in the front wall of the housing 19 and near the bottom thereof is a horizontally disposed slot 25 and the edge of the wall immediately below this slot is provided with a series of notches 26.

Arranged within the housing 19 and substantially in alinement with the left hand side wall of the housing 20 is a partition 27 and located within the housing 19 to the left of this partition and fixed upon the shaft 12 is a comparatively large cylinder 28. The surface of this cylinder is ruled or lined circumferentially as designated by 29 in order to form a series of equal sized spaces which correspond to the spaces upon the scales 22 and 24 (see Fig. 3). Appearing on the surface of this cylinder between the lines 29 are rows of figures consecutively arranged and which are for the purpose of representing the total amount of cost of an article placed upon the scale platform 17. These rows of numbers are differentially spaced apart to correspond with the arrangement of the numbers of the scales 22 and 24, and the rows of numbers appearing on the left hand half of the cylinder 28 are reversely arranged with respect to those appearing on the right hand half so that the indications will properly appear through the opening 23 as the cylinder is rotated by the weight of an article placed on the platform 17.

A rod 30 is positioned in the rear lower portion of the housing 19 and said rod slides freely through an elongated tubular bearing 31, which latter is fixed to the partition 27. This bearing 31 is of sufficient length to firmly support the shaft 30 during its sliding movement. The rear end of an arm 32 is fixed to this sliding rod 30 and said arm extends forwardly beneath the cylinders 28, thence upwardly and the forward end of said arm extends through the slot 21 and carries on its forward end a plate 33. The lower portion of this plate carries a finger 33ª which is adapted to indicate the numbers of the scale 22, and the upper portion of said plate carries a finger 33ᵇ which occupies a position immediately above the slot 21, said last mentioned finger being for the purpose of indicating the total amount appearing on the cylinder through said slot 21. The lower portion of the plate 33 is marked "Per lb." and the upper portion of said plate is marked "Sale," and thus the salesman can readily note the price per pound indicated by the finger 33ª and the total amount or cost of the article being weighed and which amount appears immediately beneath the finger 33ᵇ.

Fixed to and extending upwardly from the sliding rod 30 is an arm 34, the upper end of which extends through the slot 33 and said upper end on the exterior of the housing is provided with a plate 35 which is, in construction and functions, identical with the plate 33. By means of this indicator plate 35 the purchaser can readily see the price per pound of the article being weighed, together with the total amount of the selling price thereof.

Formed on or fixed to the sliding rod 30 is a forwardly extending arm 36 which projects through the slot 25 and the forward end of said arm is provided with a handle 36ª. This arm normally rests in one of the notches 26 and when it is desired to shift the indicating plates 33 and 35 said arm 36 is raised slightly to free it from the notch in which it has been engaged, after which said arm can be moved in either direction as desired.

Fixed to the partition 27 immediately to the rear of the shaft 12 is a bracket 37 and pivotally mounted on the lower portion thereof is a counterbalancing weight 38.

Fixed on the shaft 12 adjacent to the bracket 37 is a large drum 39 and a small drum 40. A flexible band or tape 41 is fixed to the rear end of the scale-beam 14 and extends upward through the bottom of the housing 19, and the upper portion of said tape is fixed to the larger drum 39. A flexible band or tape 42 is fixed to the underside of the weight 38 and the opposite end of this band or tape is fixed to the small drum 40. The tapes or bands 41 and 42 are fixed to opposite sides of the drums 39 and 40 so that when the tape 41 unwinds from the drum 39 the tape 42 will wind upon the drum 40 and vice versa. By such construction the weight 38 will be swung forwardly and upwardly when the drum is partially rotated under the influence of an article placed on the platform 17, and when said article is removed the weight 38, returning to its normal position, will restore the cylinder 28 and the parts carried by the shaft 12 to their normal positions.

The operation of my improved machine is as follows: Under normal conditions the various parts of the machine occupy positions seeen in Figs. 1 and 2 with the counterbalancing weight 38 holding the scale-beam 14 in a horizontal position and the cylinder 28 in a position so that a continuous row of zeros appears through the openings 21 and 23. Assuming that the article to be weighed is selling at twenty cents (20¢) per pound the operator engages the handle 36ª and moves the same in the proper direction to bring the plates 33 and 35 so that the pointers 33ª therein are directly opposite the spaces marked "20" on the graduated scales 22 and 24.

The commodity being sold is now placed on the platform 17 and the weight thereof causes the rear portion of the scale-beam 14 to move downward, thereby drawing downward on the tape 41, and consequently, imparting partial rotary movement to the cylinder 28. Assuming that the weight of the article to be sold is six pounds, then the cylinder will be partially rotated to a position where 1.20 will appear through the slots 21 and 23 directly above the numerals 20 of the graduated scales 22 and 24, thus indicating to the buyer and seller that the total amount to be paid for the article is $1.20. As soon as this weighing operation has been completed and the total amount of the commodity weighed has been computed and indicated on the surface of the drum 28, and observed by buyer and seller through slots 21 and 23, the commodity is removed from the platform 17, whereupon counterbalancing weight 38 will act to return the various parts to their normal position with a row of zeros appearing directly opposite the slots 21 and 23.

It will be readily understood that minor changes in the size, form and construction of the various parts of my improved machine may be made and substituted for those herein shown and described, without departing from the spirit of my invention, the scope of which is set forth in the appended claims.

I claim:

1. In a computing scale, a housing provided in its front and rear walls with horizontally disposed slots which are offset with respect to each other, graduated scales on said housing adjacent to said slots, a cylinder mounted for rotation within the housing, the surface of which cylinder is provided with two similar sets of indicating characters, arms arranged within the housing, the ends of which arms project through the slots, pointers on the ends of said arms adjacent to said slots, and means operable from the exterior of the housing for simultaneously and correspondingly moving said arms and pointers.

2. In a combined computing and indicating scale, the combination with weighing mechanism, of a rotatably mounted cylinder which is adapted to be actuated by said weighing mechanism and provided on its surface with two similar sets of chart indications, a housing inclosing said cylinder and provided in its front and rear walls with horizontally disposed slots which are offset with respect to each other so that the indications on the cylinder are simultaneously readable from both sides of said cylinder, a graduated scale on the exterior of the housing adjacent to each opening, a rod arranged for sliding movement through the lower portion of the housing, arms carried by said rod, which arms project through the slots in the housing, pointers carried by the outer ends of said arms, a handle connected to the rod and extending through a slot formed in the housing, and there being notches formed along the lower edge of the last mentioned slot, which notches are adapted to receive the handle to maintain the same in adjusted positions.

In testimony whereof I hereunto affix my signature in the presence of two witnesses, this 18th day of April, 1913.

FRANCIS M. GREENUP.

Witnesses:
JOHN W. THARP,
M. P. SMITH.